(12) United States Patent
Nguyen et al.

(10) Patent No.: US 7,146,474 B2
(45) Date of Patent: Dec. 5, 2006

(54) SYSTEM, METHOD AND COMPUTER PROGRAM PRODUCT TO AUTOMATICALLY SELECT TARGET VOLUMES FOR A FAST COPY TO OPTIMIZE PERFORMANCE AND AVAILABILITY

(75) Inventors: Lu Nguyen, San Jose, CA (US); Mark James Seaman, San Jose, CA (US); Syed Mohammad Amir Ali Jafri, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/387,000

(22) Filed: Mar. 12, 2003

(65) Prior Publication Data

US 2004/0181641 A1 Sep. 16, 2004

(51) Int. Cl.
*G06F 12/00* (2006.01)
*G06F 13/00* (2006.01)
(52) U.S. Cl. .................. 711/162; 711/114; 711/163
(58) Field of Classification Search ............. 711/100, 711/154, 162, 163, 114
See application file for complete search history.

(56) References Cited

U.S. PATENT DOCUMENTS

| | | | |
|---|---|---|---|
| 5,394,539 A * | 2/1995 | Neuhard et al. ............. 711/209 |
| 5,403,639 A | 4/1995 | Belsan et al. ............... 395/600 |
| 5,410,667 A | 4/1995 | Belsan et al. ............... 395/425 |
| 5,440,735 A | 8/1995 | Goldring ..................... 395/600 |
| 5,790,773 A | 8/1998 | DeKoning et al. ...... 395/182.04 |
| 5,809,511 A | 9/1998 | Peake .......................... 707/204 |
| 5,822,773 A * | 10/1998 | Pritchard et al. ........... 711/162 |
| 5,915,264 A | 6/1999 | White et al. ................. 711/168 |
| 6,038,639 A | 3/2000 | O'Brien et al. .............. 711/114 |
| 6,078,932 A | 6/2000 | Haye et al. .................. 707/204 |
| 6,088,814 A | 7/2000 | McKenzie et al. ............. 714/6 |
| 6,108,749 A | 8/2000 | White et al. ................. 711/112 |
| 6,119,208 A | 9/2000 | White et al. ................. 711/162 |
| 6,131,148 A | 10/2000 | West et al. .................. 711/162 |
| 6,154,748 A | 11/2000 | Gupta et al. ................. 707/102 |
| 6,182,198 B1 | 1/2001 | Hubis et al. ................. 711/162 |
| 6,212,531 B1 | 4/2001 | Blea et al. ................... 707/204 |
| 6,339,775 B1 | 1/2002 | Zamanian et al. .......... 707/101 |
| 6,341,341 B1 | 1/2002 | Grummon et al. .......... 711/162 |
| 6,366,987 B1 | 4/2002 | Tzelnic et al. .............. 711/162 |
| 6,393,537 B1 | 5/2002 | Kern et al. .................. 711/162 |
| 6,421,767 B1 | 7/2002 | Milillo et al. ............... 711/162 |
| 6,446,176 B1 | 9/2002 | West et al. .................. 711/162 |
| 6,457,109 B1 | 9/2002 | Milillo et al. ............... 711/162 |
| 6,546,474 B1 * | 4/2003 | Weigelt ....................... 711/162 |
| 6,708,254 B1 * | 3/2004 | Lee et al. .................... 711/120 |
| 2002/0083099 A1 | 6/2002 | Knauss et al. .............. 707/513 |

(Continued)

FOREIGN PATENT DOCUMENTS

WO    WO-01/57641 A2    8/2001

*Primary Examiner*—Tuan V. Thai
(74) *Attorney, Agent, or Firm*—Harrington & Smith,LLP

(57) ABSTRACT

A computer-implemented method includes, in response to detecting that a fast copy function has been invoked, automatically selecting at least one target volume for writing fast copy-related data, where the at least one target volume is selected for optimizing fast copy performance, and writing the fast copy data to the selected at least one target volume. Also disclosed is a data processing system having circuitry that operates in accordance with the method, as well as a computer program product, embodied on a computer readable media, that implements the method.

25 Claims, 2 Drawing Sheets

U.S. PATENT DOCUMENTS

| | | | |
|---|---|---|---|
| 2002/0129214 A1 | 9/2002 | Sarkar | 711/162 |
| 2002/0174098 A1 | 11/2002 | Wu et al. | 707/1 |
| 2002/0184213 A1 | 12/2002 | Lau et al. | 707/6 |
| 2003/0009747 A1 | 1/2003 | Duran | 717/137 |
| 2003/0046270 A1* | 3/2003 | Leung et al. | 707/1 |
| 2004/0148479 A1* | 7/2004 | Patel et al. | 711/163 |

* cited by examiner

SYSTEM, METHOD AND COMPUTER PROGRAM PRODUCT TO AUTOMATICALLY SELECT TARGET VOLUMES FOR A FAST COPY TO OPTIMIZE PERFORMANCE AND AVAILABILITY

TECHNICAL FIELD

This invention relates generally to data storage systems for data processors and, more specifically, relates to data storage systems that incorporate backup/restore functionality, more specifically a fast data copy operation known as a FlashCopy (a Registered Trademark of the International Business Machines Corporation).

BACKGROUND

In a data processing system, a backup/restore subsystem is typically used to save a recent copy or version of one or more data sets, or a portion thereof, on some form of backup data storage device, such as magnetic or optical disk drives, tape drives, or other memory. The backup/restore subsystem is used to protect against loss of data. For example, if an on-line version of one or more data sets is destroyed, corrupted, deleted, or changed because of power failure, hardware, or software error, user error or some other type of problem, the latest version of those data sets which are stored in a backup/restore subsystem can be restored and therefore the risk of loss of data is minimized.

As but one example, a log-structured array subsystem (LSA) implements "virtual volumes", wherein each virtual volume is created using a "virtual track table" having pointers to "virtual tracks" (i.e., records) in a sequential byte stream, wherein updated tracks are written to a new location at the logical end of the byte stream, and their associated pointers are reset to the new locations. Thereafter, the tracks at the old location in the sequential byte stream are no longer needed and can be released as free space for reclamation and reuse. The storage can take place in standard direct access storage device (DASD) with sequentially numbered tracks buy the use of an emulation system.

Currently available LSA subsystems generally support a fast copy function that can be referred to herein as Flash-Copy®. The fast copy function operates by copying pointers between virtual track tables representing different virtual data volumes, without actually moving any data. Reference in this regard can be made, as an example, to commonly assigned U.S. Pat. No. 6,212,531 B1, "Method for Implementing Point-In-Time Copy Using a Snapshot Function", to Blea et al. Reference with regard to fast copy operations may also be had to the following commonly assigned U.S. Pat. Nos. 6,078,932, "Point-In-Time Backup Utilizing Multiple Copy Technologies", Haye et al.; 6,131,148, "Snapshot Copy of a Secondary Volume of a PPRC Pair", West et al.; 6,182,198 B1, "Method and Apparatus for Providing a Disc Drive Snapshot Backup Capability While Allowing Normal Drive Read, Write, and Buffering Operations", Hubis et al.; and 6,393,537 B1, "Host Storage Management Control of Outboard Data Movement", Kern et al.

Reference can also be made to U.S. Pat. No. 5,915,264, "System for Providing Write Notification During Data Set Copy", White et al., that describes a write notification during copy system that functions to enable a data processor to manage the data file copy function of a disk data storage subsystem in a manner that is said to minimize the expenditure of data processor resources. This is accomplished by the write notification, during copy, system determining the source volume on the data storage subsystem, the target volume on the data storage subsystem and identifying the extents of both. The write notification during copy system then transmits data to the data storage subsystem, representative of the assignment of DASD full tracks from the source location on the data storage subsystem, as well as DASD full tracks from the target location on the data storage subsystem. The system then uses Extended Control and Monitoring (ECAM) channel programs to instruct the data storage subsystem to perform the data file copy operation using fast copy track pointer copy operations. Upon conclusion of the data file copy operation by the data storage subsystem, the write notification during copy system updates the meta data required to complete the data file copy operation and indicates whether the copy completed with or without any conflicting write operation against the source or target.

A problem exists in current storage systems that provide the capability to provide a fast copy of data within the storage system. The problem is related to the fact that the system does not select the target storage volume for the copy, but instead requires that the user manually select the target volume. As may be appreciated, this can be an error-prone procedure, as the user may inadvertently select volumes that are in use by other systems, resulting in a possible loss of data. Furthermore, unless the user has an appreciation and knowledge of the internal architecture of the data storage system, the user will not normally select a target volume that is optimal with respect to at least one of performance, availability and reliability. As but one example, if the user should select as a target volume one having one or more tracks located on the same physical disk as the source data, then a double disk failure could result in a loss of both the source volume and the target volume. The problem of manual selection of the target volume for a fast copy operation is compounded for those systems having large, virtualized data storage facilities (e.g., tens to thousands of potential target volumes located on hundreds or thousands of physical disks), as well as in those systems that provide heterogenous and dynamic environments.

SUMMARY OF THE PREFERRED EMBODIMENTS

The foregoing and other problems are overcome, and other advantages are realized, in accordance with the presently preferred embodiments of these teachings.

In one aspect this invention provides a computer program product embodied on or in a computer readable media for causing a computer to execute program instructions that result in the computer executing a method of performing a backup of data. The method includes, in response to detecting that a fast copy function has been invoked, automatically selecting at least one target volume for writing fast copy-related data, the at least one target volume being selected for optimizing fast copy performance; and writing the fast copy data to the selected at least one target volume.

In another aspect this invention provides a data processing system that includes a data storage subsystem, where there is selection logic, that is responsive to a detection that a fast copy function has been invoked, for automatically selecting at least one target volume for writing fast copy-related data. The at least one target volume is preferably selected by the selection logic for optimizing fast copy performance. There is also circuitry for writing the fast copy data to the selected at least one target volume. In one embodiment the system includes a host data processor coupled to the data storage subsystem, and the host data processor implements the selection logic, while in another embodiment the data storage subsystem implements the selection logic.

In a further aspect this invention provides a data processing system that includes at least one host coupled through a bus to a data storage system. The host includes selection means, responsive to a detection that a fast copy function has been invoked, for automatically selecting at least one target volume from a list of available target volumes, where the list is received through the bus, for writing fast copy-related data. The at least one target volume is selected by the selection means in accordance with at least one performance-related criterion and at least one reliability-related criterion. The data storage subsystem includes means for writing the fast copy data to the selected at least one target volume.

In a still further aspect of this invention provides a data storage system that includes an interface to a bus for being coupled to at least one host. The data storage system includes the selection means, responsive to a fast copy function being invoked, for automatically selecting the least one target volume from a list of available target volumes for writing fast copy-related data. The at least one target volume is selected by the selection means in accordance with at least one performance-related criterion and at least one reliability-related criterion. The data storage system further includes the means for writing the fast copy data to the selected at least one target volume.

As non-limiting examples, the at least one performance-related criterion can include at least one of a response time of the target volume and the busyness of the target volume; the at least one reliability-related criterion can include at least a potential for failure of the target volume; and a common performance-related and reliability-related criterion may be that the target volume reside on a different physical data storage media than the source target volume.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
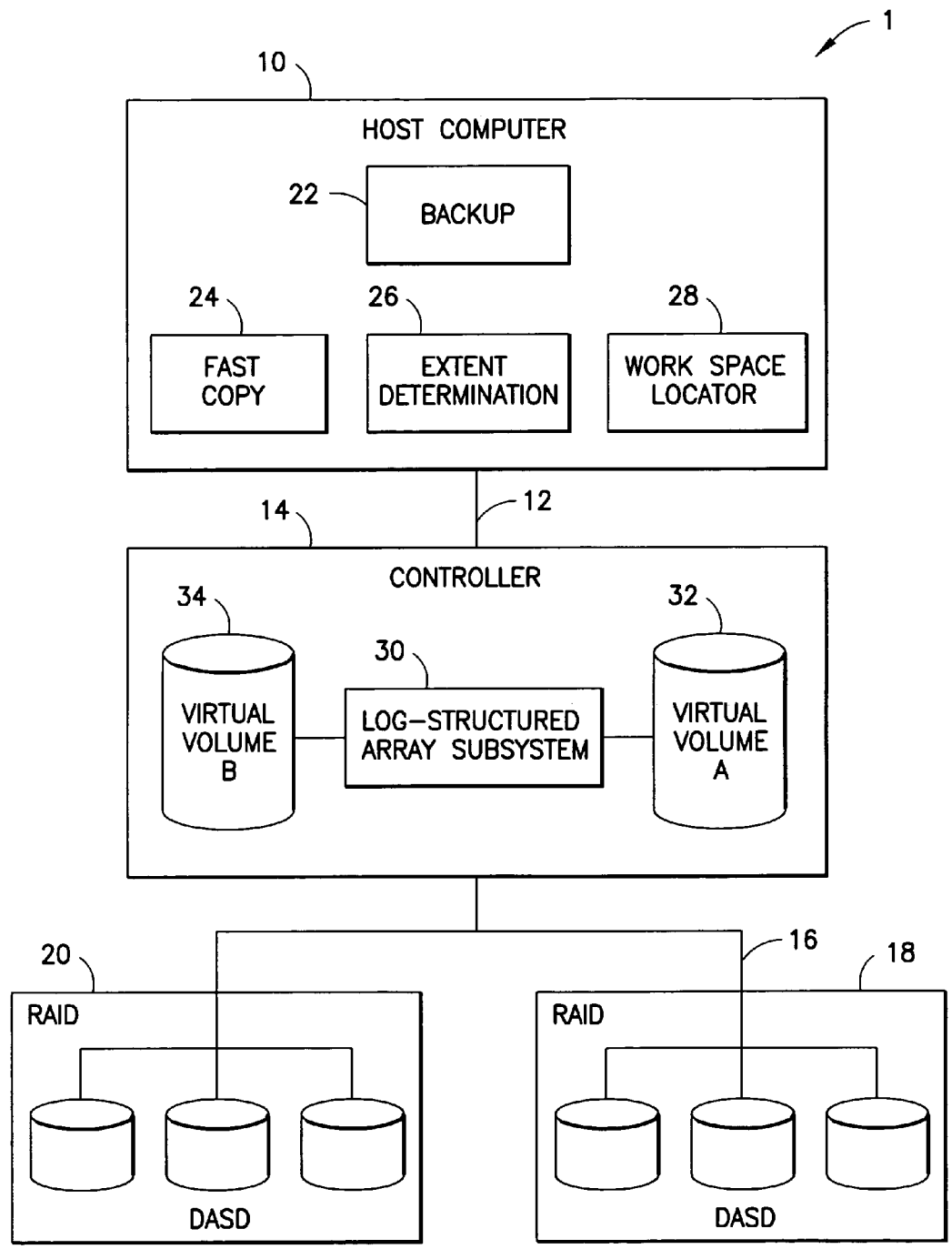
FIG. 1 is a block diagram of a storage system that is suitable for practicing this invention.

FIG. 1 is a block diagram of an exemplary and non-limiting hardware environment or system 1 that can be used to implement the preferred embodiment of the invention. A host computer 10 is coupled via a channel or bus 12 to a storage controller 14, which itself is coupled via an I/O channel 16 to one or more data storage devices 18 and 20. Although one host computer 10 is shown, in practice a plurality of host computers may all share the data storage devices 18 and 20, via the storage controller 14. In an exemplary, and non-limiting, embodiment the data storage devices 18 and 20 can each comprise RAID (redundant arrays of inexpensive disks) storage subsystems. Those skilled in the art should recognize that any of a number of types of data storage devices may be used with the present invention.

The host computer 10 executes one or more computer programs 22, 24, 26 and 28 that control the operation of the host computer 10 and its interaction with the storage controller 14. As examples, the computer programs 22, 24, 26, and 28 implement a backup unit 22, a fast copy unit 24, an extent determination unit 26, and a work space locator unit 28, respectively, although other computer programs may be used as well.

Similarly, the storage controller 14 includes one or more computer programs 30 or other logic that controls the operation of the storage controller 14 and its interaction with the host computer 10, and with the data storage devices 18 and 20. In the exemplary, and non-limiting, embodiment the computer program implements a log-structured array (LSA) subsystem 30 that provides the access logic for the data storage devices 18 and 20, although other functions may be provided as well.

The LSA subsystem 30 constructs "virtual volumes" 32 and 34 (also labeled as A and B) in the memory of the storage controller 14 for access by the host computer 10. The virtual volumes 32 and 34 may emulate a standard direct access storage device DASD for data actually stored by the LSA subsystem 30 on the data storage devices 18 and 20. In this emulation, the host computer 10 (or any computer program executed thereby) "views" the virtual volumes 32 and 34 of the LSA subsystem 30 as normal data volumes, i.e., standard DASD, with sequentially numbered tracks. To accomplish this emulation, the LSA subsystem 30 maintains a virtual track table in the memory of the storage controller 12 for each virtual volume 32 or 34, wherein the virtual track table comprises one or more pointers representing one or more sequentially numbered virtual tracks and the pointers reference data stored on the data storage devices 18 and 20. Other emulation techniques could be used as well or, in some embodiments, the storage devices 18 and 20 could be DASD data volumes, thereby eliminating the need for emulation.

Figure 2:
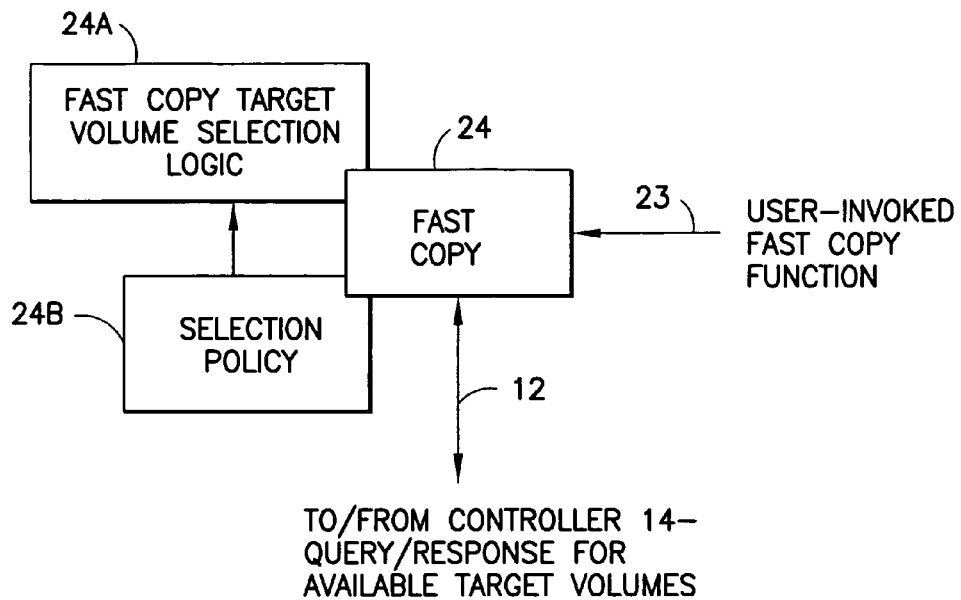
FIG. 2 is a block diagram that shows in greater detail the fast unit of FIG. 1, where the fast unit includes fast target volume selection logic and a selection policy.
Figure 3:
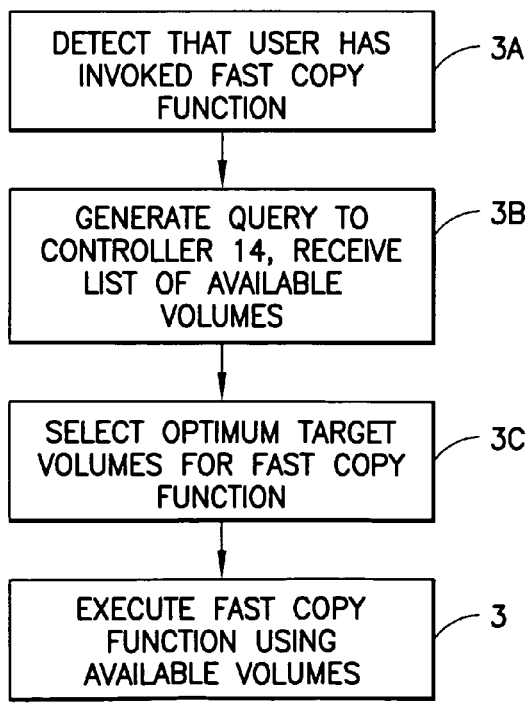
FIG. 3 is a logic flow diagram that illustrates a presently preferred method executed by the fast unit of FIG. 2, in cooperation with the fast target volume selection logic and the selection policy shown in FIG. 2.

FIG. 2 is a block diagram that shows in greater detail the fast copy unit 24, and shows that the fast copy unit 24 includes fast copy target volume selection logic 24A and a selection policy 24B. The fast copy unit 24 is responsive to an input 23 from a user of the system 1 for invoking a fast copy function. In response to the user input 23, the fast copy unit 24 performs the fast copy function in an autonomous manner, in cooperation with the fast copy target volume selection logic 24A and the selection policy 24B, as depicted in FIG. 3. That is, the fast copy unit 24 autonomously specifies the target volume(s) for the fast copy operation, while employing intelligence in optimizing the selection of the target volume(s) for performance and/or availability, a capability that was not present in the prior art.

Referring as well to FIG. 3, and in accordance with the presently preferred method, when the fast copy unit 24 detects at Block 3A that the user has invoked the fast copy function, a query is automatically generated at Block 3B and sent to the controller 14 over the bus 12. The query requests a list of available target volumes, which are received and stored. For the purposes of this invention "available" target volumes are those not already reserved for use by one or more host computers 10. Also, an "available" target volume is one having a size and a type such that the target volume matches the source volume. For example, if the source volume is a CKD volume, then the target volume must also be a CKD volume.

The fast copy target volume selection logic 24A, in cooperation with the selection policy 24B, then selects the target volume or volumes that maximize both the storage system performance and reliability (Block 3C). Note that the content of the selection policy 24B may initially represent default selection criteria, and these may be revised and/or augmented over time by an administrator of the system 1 and/or by the system 1 itself.

In a presently preferred embodiment of this invention there are at least two aspects to the selection policy 24B: performance and reliability (the latter may also be referred to more generally as availability, not to be confused with the available disk volumes returned from the controller 14 in Block 3B).

A first performance-related criterion is that a selected target volume not reside on the same physical disk, or on the same RAID array, as the source volume of the fast copy. This is desired because reads can occur from one physical disk and the writes to another. If the fast copy were to occur to the same physical disk, then the disk would have to read from one sector (source) and written to another sector (target), thereby reducing performance by a factor of at least two. A second performance-related criterion is the response time of the selected target volume. One example of a suitable metric that is indicative of response time is the disk rotational speed (e.g., 15,000 RPM versus 10,000 RPM), which can be stored in table that is accessible to the selection policy logic 24B.

A third performance-related criterion is the "busyness" of the target volume. One example of a suitable metric for indicating the busyness is the amount of time required for the controller 14 to return a response to a write command sent by the host computer 10. The preceding three performance-related criteria should not be viewed as being exhaustive, as others may also be employed, in addition to or in place of the three performance-related criteria described above.

It is preferred that the performance-related criteria be averaged over time to avoid the fast copy target volume selection logic 24A making decisions on performance metric trends, as opposed to instantaneous performance metrics. If desired, these criteria can also be combined with user-defined business logic to further maximize the performance.

A first reliability-related criterion is, as in the performance-related case, is that the selected target volume not reside on the same physical disk, or on the same RAID array, as the source volume of the fast copy. In this case, however, the rationale for the criterion is to avoid a loss of both the source and the target data upon the occurrence of a hardware failure. A second reliability-related criterion is the disk mean-time-between-failure (MTBF). Related to the second criterion can be the following three criteria: the age of the disk (more precisely the time-in-service), the type of disk (e.g., Type A may be deemed to inherently be more reliable than Types B and C), and an error-log associated with the disk. A third reliability-related criterion involves the use of failure prediction technology, such as S.M.A.R.T. (Self-Monitoring, Analysis and Reporting Technology). The preceding reliability-related criteria should not be viewed as being exhaustive, as others may also be employed, in addition to or in place of the reliability-related criteria described above. In general, the reliability-related criteria may be viewed as being indicative of the potential for failure of the target volume.

In any event, the operation of Block C serves to select a target volume or volumes for the fast copy operation that are deemed to maximize both the storage system performance and reliability. The selected target volumes can be ranked based on their determined suitability for use in the fast copy operation.

During the operation of Block C it is preferred that only the available target volumes are subjected to examination by the fast copy target volume selection logic 24A, in cooperation with the selection policy 24B, and only available target volumes are ranked based on their suitability as target volumes for the fast copy operation.

This process continues until a match occurs, at which time at Block 3D the fast copy unit 24 executes the fast copy operation using the selected one or ones of the available volume(s).

The end result is that user-induced errors that can result in lost data are eliminated, ease of use is greatly enhanced, and the user need not become involved in selecting the target volumes for the fast copy function. In addition, the fast copy storage occurs in those volumes that have been determined to be the most optimum, from a performance and reliability perspective, for the fast copy operation itself.

Note that while this enhanced functionality made possible by this invention is shown as residing at the level of the host 10, in other embodiments this functionality could be implemented in the data storage subsystem, such as in the controller 14. In this case the Block 3B of FIG. 3 can be modified or eliminated, as the list of available volumes maybe assumed to be locally resident. One advantage of the list of available volumes residing in the controller 14 is that the target volumes reserved by the storage subsystem for the fast copy function can be removed from the pool of potential volumes that are accessible by other users. In this embodiment the controller 14 can be informed that the fast copy function has been invoked by a message received from the host 10 through the bus 12.

It is also within the scope of this invention to automatically redefine target volumes in the event of a failure or other change in the performance of the system 1, such that the redefinition of target volumes is appropriate based on user-specified performance requirements, as expressed by the selection policy unit 24B.

It is also within the scope of this invention, for a case where no suitable target volume is found, to employ the controller 14 to create a target volume that matches the target volume requirements, based on the selection policy logic 24B, and then use the newly created volume as the FlashCopy® target volume.

Based on the foregoing it should be realized that an aspect of this invention is computer program product embodied on or in a computer readable media for causing a computer to execute program instructions that result in the computer executing a method of performing a backup of data. The computer could be at the level of the host 10, at the level of the controller 14, or at both levels in a cooperative arrangement. The data backup method executes a fast data copy function, in response to a fast data copy function being invoked, by automatically selecting at least one target volume from a list of available target volumes for writing fast copy-related data, where the at least one target volume is selected automatically by the computer in accordance with at least one performance-related criterion and at least one reliability-related criterion. The method further writes the fast copy data to the selected at least one target volume residing on, in the embodiment of FIG. 1, at least one physical disk.

As non-limiting examples the at least one performance-related criterion comprises at least one of a response time of the target volume and the busyness of the target volume, the at least one reliability-related criterion comprises at least a potential for failure of the target volume, and a common performance-related and reliability-related criterion is that the target volume reside on a different physical disk than the source target volume.

The foregoing description has been a full and informative description of the best method and system presently contemplated for carrying out the present invention which is known to the inventor at the time of filing the patent application. Of course, many modifications and adaptations will be apparent to those skilled in the relevant arts in view of the description when read in conjunction with the accompanying drawings and the appended claims. While the system and method described herein are provided with a certain degree of specificity, the present invention could be implemented with either greater or lesser specificity, depending on the needs of the user. Further, some of the features of the present invention could be used to advantage without the corresponding use of other features. In addition, the various Blocks shown in FIG. 3 could be presented in a different order. As such, the foregoing description should be considered as merely illustrative of the principles of the present invention, and not in limitation thereof, since this invention is defined by the claims which follow.

What is claimed is:

1. A computer program product embodied on or in a computer readable medium for causing a computer to execute program instructions that result in the computer executing a method of performing a backup of data, the method comprising:

in response to detecting that a fast copy function has been invoked, automatically selecting at least one target volume for writing fast copy-related data, the at least one target volume being selected for optimizing copy performance; and writing the copy-related data to the selected at least one target volume, where the fast copy related data is written from a source volume and automatically selecting comprises considering a selection policy that comprises at least one performance-related criterion and at least one reliability-related criterion, where a common performance-related and reliability-related criterion is that the target volume reside on a different physical data storage device than the source target volume.

2. A computer program product as in claim 1, where the selected at least one target volume is selected from a list of available volumes.

3. A computer program product as in claim 2, where if no target volume is available, further comprising creating an available target volume in a data storage subsystem.

4. A computer program product as in claim 1, where automatically selecting comprises obtaining a list of available volumes in a data storage subsystem, and where the selected at least one target volume is selected from the list of available volumes.

5. A computer program product as in claim 1, where the at least one performance-related criterion comprises at least one of an identity of the target volume, a response time of the target volume and the busyness of the target volume.

6. A computer program product as in claim 1, where the at least one reliability-related criterion comprises at least one of an identity of the target volume, and a potential for failure of the target volume.

7. A computer program product as in claim 1, where a common performance-related and reliability-related criterion is that the target volume reside on a different physical data storage media than the source target volume.

8. A computer program product as in claim 1, where the at least one performance-related criterion comprises the target volume being a same type and having a same size as the source volume.

9. A computer program product as in claim 1, where said computer that executes the program instructions comprises a part of a host system that is coupled to a data storage system, where said data storage system comprises said source and target volumes.

10. A computer program product as in claim 1, where said computer that executes the program instructions comprises a part of a data storage system that is coupled to a host system, where said data storage system comprises said source and target volumes.

11. A data processing system comprising a data storage subsystem, comprising:

selection logic, responsive to a detection that a fast copy function has been invoked, for automatically selecting at least one target volume for writing fast copy-related data, the at least one target volume being selected by the selection logic for optimizing copy performance;

circuitry for writing the fast copy-related data to the selected at least one target volume;

a data storage subsystem comprising at least two data storage devices;

a controller for controlling operations of the data storage subsystem, for interacting with at least one host computer, and for writing copy-related data to the selected at least one target volume, the controller comprising the circuitry for writing the copy-related data to the selected at least one target volume; and a selection policy unit coupled to said selection logic, said selection policy unit storing selection criteria, the selection logic considering during operation said at least one performance-related criterion and at least one reliability-related criterion, wherein a common performance-related and reliability-related criterion is that the target volume reside on a first physical data storage device that is different from a second physical data storage device that the source target volume resides on, the controller comprising a log-structured array subsystem that provides access logic for the first and second physical data storage devices.

12. A data processing system as in claim 11, where said at least one selection criterion is provided by a user.

13. A data processing system as in claim 11, where said selection logic selects at least one target volume from a list of available volumes.

14. A data processing system as in claim 13, further comprising means, responsive to a condition that no target volume is available, for creating an available target volume in said data storage subsystem, the target volume being created to match at least one characteristic of the source volume.

15. A data processing system as in claim 11, where said selection logic obtains a list of available volumes in said data storage subsystem, and where the selected at least one target volume is selected from the list of available volumes.

16. A data processing system as in claim 11, where the at least one performance-related criterion comprises at least one of an identity of the target volume, a response time of the target volume and the busyness of the target volume.

17. A data processing system as in claim 11, where the at least one reliability-related criterion comprises at least one of an identity of the target volume and a potential for failure of the target volume.

18. A data processing system as in claim 11, where a common performance-related and reliability-related criterion is that the target volume reside on a different physical data storage media than the source target volume.

19. A data processing system as in claim 11, where the at least one performance-related criterion comprises the target volume being a same type and having a same size as the source volume.

20. A data processing system as in claim 11, where said system comprises at least one host data processor coupled to said data storage subsystem through a bus, and where said host data processor comprises said selection logic.

21. A data processing system as in claim 11, where said system comprises a host data processor coupled to said data storage subsystem through a bus, and where said data storage subsystem comprises said selection logic.

22. A data processing system comprising at least one host coupled through a bus to a data storage system, said at least one host comprising selection means, responsive to a detection that a fast copy function has been invoked, for automatically selecting at least one target volume from a list of available target volumes, the list being received through said bus, for writing fast copy-related data, the at least one target volume being selected by the selection means in accordance with at least one performance-related criterion and at least one reliability-related criterion; said data storage subsystem comprising means for writing the fast copy-related data to the selected at least one target volume, the at least one target volume being selected by the selection logic for optimizing copy performance, where the fast copy-related data is written from a source volume and the at least one performance-related criterion comprises at least one of a response time of the target volume and the busyness of the target volume, where the at least one reliability-related criterion comprises at least a potential for failure of the target volume, and where a common performance-related and reliability-related criterion is that the target volume reside on a different physical data storage media than the source target volume, the data storage subsystem comprising a first data storage device and a second data storage device, the source volume residing on the first data storage device and the at least one target volume residing on the second data storage device.

23. A data storage system comprising an interface to a bus for being coupled to at least one host, said data storage system comprising selection means, responsive to a fast copy function being invoked, for automatically selecting at least one target volume from a list of available target volumes for writing fast copy-related data, the at least one target volume being selected by the selection means in accordance with at least one performance-related criterion and at least one reliability-related criterion, further comprising means for writing the fast copy-related data to the selected at least one target volume, the at least one target volume being selected by the selection logic for optimizing copy performance, where means for writing the fast copy-related data to the target volume writes the fast copy-related data from a source volume, where the at least one performance-related criterion comprises at least one of a response time of the target volume and the busyness of the target volume, where the at least one reliability-related criterion comprises at least a potential for failure of the target volume, and where a common performance-related and reliability-related criterion is that the target volume reside on a different physical data storage media than the source target volume, the data storage subsystem comprising a first data storage device and a second data storage device, the source volume residing on the first data storage device and the at least one target volume residing on the second data storage device.

24. A method to perform a data copy function in a data processing system that comprises at least one host data processor coupled through a bus to a data storage system comprising a plurality of physical disks, comprising in response to a data fast copy function being invoked:

automatically selecting at least one target volume from a list of available target volumes for writing fast copy-related data, the at least one target volume being selected in accordance with at least one performance-related criterion and at least one reliability-related criterion, the at least one target volume being selected by the selection logic for optimizing copy performance; and writing the fast copy-related data to the selected at least one target volume residing on at least one of said physical disks, where the fast copy-related data is written from a source volume and where automatically selecting considering a selection policy that comprises at least one performance-related criterion and at least one reliability-related criterion, where a common performance-related and reliability-related criterion is that the target volume reside on a different physical data storage device than the source target volume.

25. A method as in claim 24, where the at least one performance-related criterion comprises at least one of a response time of the target volume and the busyness of the target volume, where the at least one reliability-related criterion comprises at least a potential for failure of the target volume.

* * * * *